UNITED STATES PATENT OFFICE.

ROBERT BREWSTER, OF NEW BARNET, ENGLAND.

STEP AND BEARING FOR MACHINERY.

SPECIFICATION forming part of Letters Patent No. 474,286, dated May 3, 1892.

Application filed April 4, 1891. Serial No. 387,673. (No model.)

*To all whom it may concern:*

Be it known that I, ROBERT BREWSTER, a subject of the Queen of Great Britain, residing at New Barnet, in the county of Herts, England, have invented certain new and useful Improvements in Steps and Bearings for Machinery; and I do hereby declare that the following is a full, clear, and exact description of the invention, which will enable others skilled in the art to which it appertains to make and use the same.

The object of my present invention is the manufacture of steps and bearings from a ceramic material which, while possessing great hardness, is capable of being readily worked, of taking a high polish, and is otherwise suitable for bearing-surfaces, and by the employment of my improved bearings the necessity for oil lubrication is dispensed with, plain water or soap and water being preferable.

The material I employ is composed of the following ingredients, preferably in about the proportions stated: feldspar, fifty parts; rock-crystal, fifty parts; china-clay, thirty parts, and flux (preferably borax) thirty parts. These materials are well ground and combined with water in the usual manner of working pottery bodies or materials, and they are made by the ordinary processes into a comparatively dry clay or body or into what is known in the pottery trade as "slip." The material thus prepared is when in the state of comparatively dry clay or body molded into the required shapes by means of dies and pressure, or it may be first thrown and then turned into form, or when in the form of slip it is molded into the shape required by pouring the same into molds, as is well understood in the pottery trade. Steps and bearings formed of the above materials are dried and fired, after which the bearing-surfaces, if not sufficiently true, will be turned, bored, or ground to the required form and then polished, if required, or as may be necessary. Steps or bearings of the character herein described will be held in metallic or other suitable supports or carriers.

In the accompanying drawings I have represented various applications of my invention.

Figure 1 is a face view, partly in section, and Fig. 2 is a cross-section, of a pillow-block. Fig. 3 is a face view of a pitman-head. Fig. 4 is a vertical section of a step box or bearing for the lower end of a vertical shaft. Fig. 5 is a vertical section of a step-bearing for the end of a spindle. Figs. 6, 7, and 8 are respectively a front elevation, a side elevation, and plan of an open bearing.

The pillow-block represented in Figs. 1 and 2 is constructed in the usual manner, except that the bearing-pieces $a$, in lieu of being the ordinary brasses, are made of the ceramic material herein described. They are also formed with flanges $a'$ to prevent end motion and with an angular-shaped part $a^2$ to prevent rotary motion within the pillow-block, as is usual with ordinary brasses.

The pitman-head represented in Fig. 3 is constructed in the usual manner, except that the bearing-pieces $a$, in lieu of being the usual brasses, are made of the ceramic material herein described.

The step box or bearing represented at Fig. 4, instead of being fitted with the usual cylindrical and disk-shaped metal bearing-pieces, is fitted with such shaped parts $b\ b'$ made of the ceramic material herein described.

The spindle step or bearing represented at Fig. 5 consists of a block $c$, made of the ceramic material herein described, embedded in a socket or recess formed for it in a metal carrier. In the same figure I have represented other bearing-pieces $d$, made of the same material and serving to support the shaft at a point intermediate of its extremities.

I would remark that the ceramic material herein described is of a hard vitreous character, which in wear will preserve a smooth and polished surface, the entire substance thereof being throughout of the same vitreous character, and I would further remark that although the proportions of the materials stated to be used in the manufacture of such ceramic steps and bearings are preferable the proportions of such materials may be somewhat varied and other equivalent materials may be employed so long as steps and bearings manufactured therefrom are sufficiently hard, smooth, and vitreous throughout their entire substance to receive and retain a smooth and polished surface. A ceramic material requiring glazing is of no value in the manufacture of steps and bearings.

I have found that steps and bearings made as above described can be used for a considerable time with little or no lubricant, without heating, and are so hard that wear is reduced to a minimum.

Having fully described my invention, what I desire to claim and secure by Letters Patent is—

1. Steps and bearings for machinery, consisting of feldspar, rock-crystal, china-clay, and a flux.

2. Steps and bearings for machinery, consisting of feldspar, rock-crystal, china-clay, and borax in about the proportions stated.

ROBERT BREWSTER.

Witnesses:
  CLAUDE K. MILLS,
  H. SEYMOUR MILLS,
23 *Southampton Buildings, London, W. C.*